United States Patent
Sullivan

[19]

[11] Patent Number: 6,094,162
[45] Date of Patent: Jul. 25, 2000

[54] LOW-POWER SATELLITE-BASED GEOPOSITIONING SYSTEM

[75] Inventor: Mark Sullivan, Annandale, Va.

[73] Assignee: Eagle Eye Technologies, Inc., Herndon, Va.

[21] Appl. No.: 09/244,124

[22] Filed: Feb. 4, 1999

Related U.S. Application Data

[62] Division of application No. 08/974,839, Nov. 20, 1997, Pat. No. 5,955,986.

[51] Int. Cl.[7] .............................. H04B 7/185; G01S 5/02
[52] U.S. Cl. ...................... 342/357.01; 701/213; 375/207
[58] Field of Search .............................. 342/357.01, 457; 701/213; 375/207, 343

[56] References Cited

U.S. PATENT DOCUMENTS

| | | | |
|---|---|---|---|
| 4,701,934 | 10/1987 | Jasper | 342/418 |
| 5,303,393 | 4/1994 | Noreen et al. | 455/3.2 |
| 5,361,072 | 11/1994 | Barrick et al. | 342/133 |
| 5,414,432 | 5/1995 | Penny, Jr. et al. | |
| 5,459,473 | 10/1995 | Dempster et al. | 342/357 |
| 5,469,468 | 11/1995 | Schilling | 375/200 |
| 5,557,637 | 9/1996 | Glynn | 375/271 |
| 5,565,764 | 10/1996 | Priebe et al. | |
| 5,594,754 | 1/1997 | Dohi et al. | 375/200 |
| 5,627,546 | 5/1997 | Crow | 342/352 |
| 5,691,980 | 11/1997 | Welles, II et al. | 342/457 |
| 5,752,976 | 5/1998 | Duffin et al. | 607/32 |
| 5,872,810 | 2/1999 | Philips et al. | 375/222 |

Primary Examiner—Theodore M. Blum
Attorney, Agent, or Firm—Kenyon & Kenyon

[57] ABSTRACT

A Low Earth Orbiting satellite system provides location and data communications services to mobile users equipped with a receiver/transmitter. The receiver/transmitter acts as a transponder that responds to a query transmitted over the satellite network. The response is sent after a precisely controlled time interval after the transponder receives the query so that the ground station can estimate the length of the propagation path from the satellite to the transponder. The transponder also transmits the response at a frequency that is proportional to the frequency of the received query so that the ground station can estimate the first and second derivatives of the length of the propagation path according to the measured Doppler shift. The ground station also estimates the satellite positioning using telemetry from the satellite obtained from the on-board GPS receiver. The position of the user terminal relative to the satellite position is then determined from the path length measurements. Given the satellite position and velocity, the measured path length and first and second derivatives determine the angle between the direction of satellite motion and the line of bearing to the user terminal. This angle defines a cone with the satellite at the origin. The user terminal position is somewhere on the circle defined by the cone and the estimated path length The intersection of this circle with the surface of the Earth yields two possible user positions, which ambiguity can be resolved by three techniques: (1) use of knowledge of which beam the signal was received in, (2) use of earlier position data; or (3) using nearby satellites to receive the signal. The user terminal uses a single frequency reference to provide timing for the receive and transmit frequency synthesizers and for the analog-to digital and digital-to-analog converters.

9 Claims, 12 Drawing Sheets

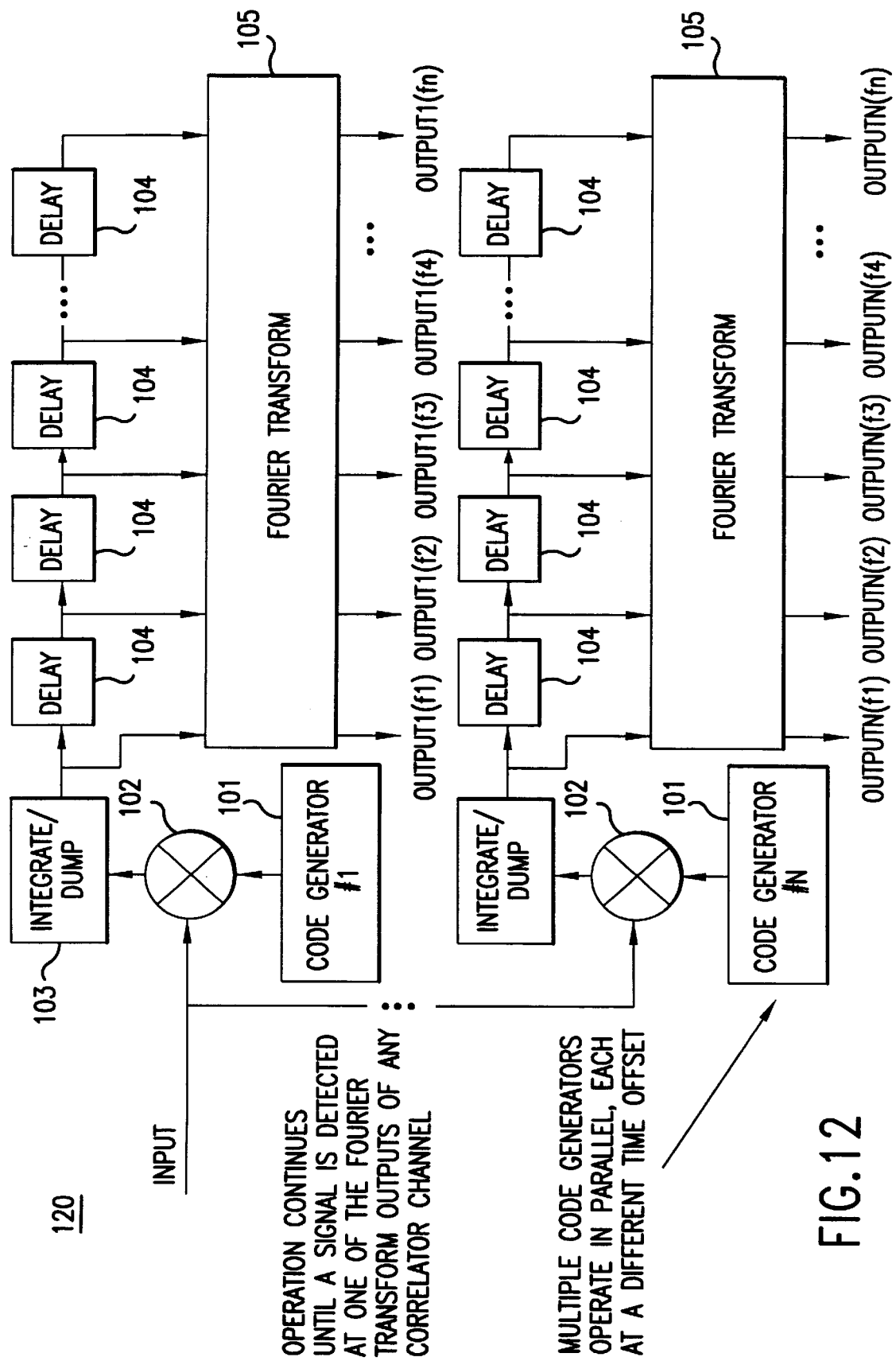

LOW-POWER SATELLITE-BASED GEOPOSITIONING SYSTEM

This is a division of U.S. patent application Ser. No. 08/974,839, filed Nov. 20, 1997, now U.S. Pat. No. 5,955,986.

BACKGROUND OF THE INVENTION

The present invention relates generally to geopositioning systems, and more particularly to a low earth orbiting satellite-based geopositioning system.

This application is related to U.S. patent application Ser. No. 08/877,571, entitled "Method and Apparatus for Precision Geolocation," filed on Jun. 17, 1997 by Matthew Schor, and assigned to the same assignee of the present application. U.S. patent application Ser. No. 08/877,571 is hereby incorporated by reference as if repeated herein in its entirety, including the drawings. This application discloses a technique for improving a positional accuracy of a satellite-based geopositioning system by first measuring the position of a reference at a known location, determining an error vector from the measured position and the known position, measuring the position of the unknown transceiver, and then applying the error vector to the measured position. As part of the measurement process, this application discloses the use of the Doppler shift in the transmitted signal to determine the position of a transceiver. In this system, the transceiver receives a signal from the satellite and transmits a response. In other words, the transceiver acts as a transponder.

A first requirement of a geopositioning system is that it be applicable to a broad range of uses. To do so, the geopositioning system must be able to determine the location within buildings as well as outside buildings. This requires operating with extremely low signal levels due to the large attenuation caused by buildings. Consequently, most existing geopositioning systems are limited in their applicability due to their inability to receive signals from within buildings.

Another requirement of a geopositioning system is transmission security. Many potential users of geopositioning systems do not necessarily want their locations being broadcast in a way that makes their position available to the public at large. Consequently, the link between the satellite and the transmitter/receiver should be a low power and relatively secure transmission.

Spread spectrum communication systems are known to provide this capability because they transmit across a broad frequency spectrum and each frequency cell contains a small amount of transmitted energy. As a result, the radiated signal of a spread spectrum signal resembles noise. Furthermore, to receive and decode a spread spectrum signal, one must know the exact coding used to spread the transmitted signal.

To properly receive a spread spectrum signal, however, one must first obtain the timing of the transmitted signal. This involves determining the frequency as well as the phase of the chipping sequence.

Some known spread spectrum systems transmit at a high data rate, which enables the receiver to integrate over a short period of time, thus allowing for more frequency uncertainty. However, as discussed above a geopositioning system must be able to penetrate buildings. Consequently, to operate with extremely low power signals, a lower data rate must be used to provide sufficient processing gain to overcome the building attenuation. However, longer integration times incur greater losses due to frequency errors, which means that the time required to acquire the signal increases.

There are two separate issues with Doppler frequency. The first is geopositioning accuracy. The transponder must accurately track the Doppler frequency, and the ground station must accurately measure it to provide good position estimates, as the position estimates are a function of the Doppler frequency.

The second issue regarding Doppler is signal acquisition. The transponder and the ground station initially have only a rough idea of the frequency of the received signal because of Doppler uncertainty, which can be tens of kilohertz. If the receiver tunes to a frequency that is too far from the correct frequency, then the process of integration fails to detect the signal due to losses. The maximum acceptable frequency error depends upon the integration time. Longer integrations require lower frequency errors. If the total Doppler uncertainty exceeds the maximum acceptable frequency error for a given integration interval, then the receiver must perform a search for the correct frequency. The receiver tunes to a frequency, integrates, and looks for signal presence. If no signal is detected, the receiver tunes to a new frequency and the process is repeated. The number of times this process is repeated depends upon the integration interval, with longer integration times leading to longer frequency searches. The receiver does not need to know the Doppler within a few Hertz in this case unless the integration time is very long.

Thus, the two major problems facing the designer of a geopositioning waveform are acquisition of timing and Doppler. If the integration time required to detect a ranging pulse is T and the chipping rate is $f_c$, then a simple serial search of all possible timing offsets using a conventional correlation receiver can take up to $T^2 f_c$ seconds to acquire the ranging signal. For example, with $T=\frac{1}{50}$ seconds, and $f_c=1$ MHZ, the acquisition time might be as large as 400 seconds, which is almost seven minutes.

This problem is made even worse if the Doppler offset frequency is unknown as well. The loss L in decibels (dB) due to a coherent integration across T seconds with uncompensated Doppler off Hz is given by:

$$L = 10\log_{10}\left(\frac{\sin(\pi fT)}{\pi fT}\right).$$

This loss is shown as a function of the dimensionless parameter $fT$ in FIG. 5. The loss will be less than 1 dB of the maximum integration time is less than about $\frac{1}{4}f$. If D is the maximum Doppler uncertainty, then the maximum time needed to execute a serial search is $2DT^2$. For example, if $D=100$ kHz, and $T=\frac{1}{50}$, then the search time might be as great as 80 seconds.

If timing and Doppler are jointly estimated using a serial search, the total acquisition time is given by $2Df_c T^4$. Combining the two examples above, we have a total acquisition time of almost nine hours! Clearly, this is not acceptable for most applications.

Unfortunately, the requirement of tracking a user within a building requires increased processing gain, which in turn requires resolution of the frequency to within a few Hertz, which in a spread spectrum system causes the acquisition time to be extremely long.

One example, of such a system is the Global Positioning System (GPS). When cold starting a GPS receiver, the receiver can take several minutes to acquire the incoming signal.

The present invention is therefore directed to the problem of developing a geopositioning system that is capable of operating at extremely low signal levels, such as those that might be encountered inside of a building, while simultaneously being capable of rapidly acquiring the signal in the presence of large Doppler uncertainties associated with Low Earth Orbiting (LEO) satellite systems.

SUMMARY OF THE INVENTION

The present invention solves this problem by using the synchronization waveform rather than the data waveform for rapid acquisition of Doppler and code timing, and by transmitting a signal from the user terminal at a frequency that is proportional to the incoming frequency, thereby eliminating the absolute oscillator frequency as a source of error. This enables use of a more inexpensive oscillator, which broadens the number of practical applications of a geopositioning system.

One important aspect of the present invention is the use of a synchronization signal with a short repetition interval. The receiver integrates over short time periods initially to produce a sequence of integrator outputs. These integrator outputs are then processed by a Fast Fourier Transform (FFT) algorithm to determine the Doppler frequency close enough for the receiver to operate. This estimate is not intended to provide the accuracy needed for precise positioning; that is provided by subsequent processing. However, this estimate is sufficient to enable the receiver to then quickly acquire the data waveform. In this implementation, the FFT acts, in effect, as a bank of parallel receivers, each tuned to a different part of the spectrum. The signal acquisition process is accelerated because part of the frequency search is performed by the FFT is parallel.

According to one aspect of the present invention, a method for receiving a signal, which includes a synchronization signal and a data signal, includes the steps of: a) integrating a synchronization signal with a short repetition interval over short time periods to produce a sequence of integrator outputs; b) processing the integrator outputs with a Fast Fourier Transform algorithm to determine a Doppler frequency that is sufficiently close for the receiver to operate; and c) using the Doppler frequency in subsequent receiver processing to receive the data signal.

There are at least three ways to implement the above method of the present invention. The first way, termed the serial single correlator implementation, further includes the steps of: d) mixing the synchronization signal with a synchronization code generated by a code generator; e) decimating the mixed synchronization signal and synchronization code to a length of a code used to create the synchronization signal; f) delaying the decimated mixed synchronization signal and synchronization code with a plurality of delay elements to create a plurality of signals spaced at a code interval of the synchronization signal; g) transforming the plurality of signals from step f) to a plurality of frequency related signals; and h) advancing a timing of the code generator until one of the plurality of frequency related signals in step g) exceeds a predetermined level.

A second way, termed the parallel matched filter implementation, includes the additional steps of: d) inputting the synchronization signal to a matched filter, which matched filter is matched to a code sequence used to create the synchronization signal; e) delaying an output of the matched filter with a plurality of delay elements to create a plurality of signals spaced at a code interval of the synchronization signal; f) transforming the plurality of signals from step f) to a plurality of frequency related signals; and g) performing steps d) through f) until one of the plurality of frequency related signals in step f) exceeds a predetermined level.

A third way, termed the hybrid multiple correlator implementation, includes the additional steps of: d) inputting the synchronization signal to a plurality of mixers; e) inputting a same synchronization code generated to each of the plurality of mixers, but offsetting each synchronization code with a different time offset; f) decimating an output of each of the plurality of mixers to a length of a code used to create the synchronization signal; g) delaying each of the decimated outputs of the mixers with a plurality of delay elements to create a plurality of groups of delayed signals, wherein the delayed signals within a group are spaced apart by a code interval of the synchronization signal; h) transforming each group of delayed signals from step f) to a group of frequency related signals, thereby forming a plurality of groups of frequency related signals; and i) performing steps d) through h) until one of the frequency related signals in the plurality of groups of frequency related signals exceeds a predetermined threshold.

According to another aspect of the present invention, in a communication system, a method for rapidly acquiring a spread-spectrum signal at very low signal levels with large frequency uncertainty, includes the steps of: a) receiving a synchronization signal and a data signal; b) inputting the synchronization signal to a correlator; c) inputting a code sequence used to generate the synchronization signal to the correlator; d) providing a sequence of correlator outputs to a fast Fourier transform, which outputs a plurality of frequency related signals; e) searching each of the plurality of frequency related signals for a maximum amplitude; f) comparing the maximum amplitude against a predetermined threshold; and g) advancing a timing of the code sequence and repeating steps c) through 0) until the maximum amplitude in f) exceeds the predetermined threshold, which indicates that a correct code sequence is a current code sequence being used in step c) at a Doppler frequency determined by a frequency related to the maximum fast Fourier transform output determined in step e).

In this method, it is particularly advantageous if the method also includes the steps of: h) mixing the synchronization signal with the code sequence; i) decimating the mixed synchronization signal and code sequence by a length of the code sequence; and j) delaying the decimated and mixed synchronization signal and code sequence to create the sequence of correlator outputs.

In a communication system, another aspect of the present invention is a method for rapidly acquiring a spread-spectrum signal at very low signal levels with large frequency uncertainty, which method includes the steps of a) receiving a synchronization signal and a data signal; b) inputting the synchronization signal to a matched filter that is matched to the code sequence used to create the synchronization signal; c) providing a sequence of matched filter outputs to a fast Fourier transform, which outputs a plurality of frequency related signals; d) searching each of the plurality of frequency related signals for a maximum amplitude; e) comparing the maximum amplitude against a predetermined threshold; and f) performing steps b) through e) until the maximum amplitude in d) exceeds the predetermined threshold, which indicates that a Doppler frequency is determined by a frequency related to the maximum fast Fourier transform output determined in step d).

According to another aspect of the present invention, an apparatus for receiving a signal, which includes a synchronization signal having a short repetition interval and a data signal, includes an integrator, a transformer, and a receiver. The integrator integrates the synchronization signal over short time periods to produce a sequence of integrator outputs. The transformer is coupled to the integrator and transforms the integrator outputs to a plurality of frequency related signals to determine a Doppler frequency that is sufficiently close for the receiver to operate. The receiver is coupled to the transformer and uses the Doppler frequency in subsequent processing to receive the data signal.

According to the present invention, one particularly advantageous embodiment of the above apparatus further includes a code generator, a mixer, and several delay elements. The code generator generates a code sequence, and has a timing. The mixer is coupled to the code generator and mixes the synchronization signal with a synchronization code generated by the code generator. The integrator is coupled to the mixer and decimates the mixed synchronization signal and synchronization code to a length of a code used to create the synchronization signal. The delay elements are coupled to the integrator and delay the decimated mixed synchronization signal and synchronization code to create signals spaced at a code interval of the synchronization signal. The timing of the code generator is advanced until one of the frequency related signals output by the transformer exceeds a predetermined level.

Another embodiment of the above apparatus of the present invention also includes a matched filter, several delay elements, and a processor. The matched filter receives the synchronization signal, and is matched to a code sequence used to create the synchronization signal. The delay elements are coupled to the matched filter and delay an output of the matched filter to create signals spaced at a code interval of the synchronization signal. The processor monitors the frequency related signals to detect when one of them exceeds a predetermined level.

Another aspect of the present invention includes an apparatus for receiving a signal, which includes a synchronization signal having a short repetition interval and a data signal. This apparatus includes multiple code generators, mixers, integrators, groups of delay elements and transformers. Each of the code generators generates the same code sequence but offset by different time offset. Each of the mixers is coupled to one of the code generators, and mixes the code sequence with the received synchronization signal. Each of the integrators is coupled to one of the mixers, and decimates the output of the mixer to a length of a code used to create the synchronization signal. Each of the groups of delay elements is coupled to one of the integrators, and delays each of the decimated outputs of the mixers to create a group of delayed signals. The delayed signals are spaced apart by a code interval of the synchronization signal. Each of the transformers transforms one group of delayed signals to a group of frequency related signals, thereby forming a plurality of groups of frequency related signals. The detector monitors the plurality of groups of frequency related signals until one of the frequency related signals in the plurality of groups of frequency related signals exceeds a predetermined threshold.

According to the present invention, in a geopositioning system including a ground station, at least one satellite, and a transceiver on the surface of the earth, a method for determining a position of the transceiver includes the steps of using a signal transmitted from a satellite to query the transceiver causing the transceiver to transmit a response, and transmitting the response from the transceiver to the satellite using a frequency that is proportional to the incoming frequency. This avoids the introduction of additional frequency ambiguity due to a frequency source in the transceiver.

One advantageous embodiment of the method of the present invention uses a spread spectrum signal as the signal transmitted from the transceiver. In this case, this embodiment also uses the method for rapidly acquiring the spread spectrum signal described above.

According to the present invention, a method for determining a position of a transceiver on the surface of the earth comprises the steps of: a) transmitting a signal from the transceiver in response to a query from a signal from a satellite; b) transmitting the response after a precisely controlled time interval after the transceiver receives the query; c) estimating a length of a propagation path from the satellite to the transceiver from a time delay in the response; d) measuring a Doppler shift in the response from the transceiver; e) estimating either a first or second derivative of a path length from the satellite to the transceiver from the measured Doppler shift; f) estimating the satellite position and velocity from satellite telemetry data; g) determining an angle between the direction of satellite motion and a line of bearing to the transceiver from either the first or second derivative and the satellite position and velocity; and h) determining a position of the transceiver on the surface of the earth as being one of two points where the surface of the earth intersects with a base of a cone defined by the angle in step g) and the estimated path length.

In this embodiment of the present invention, the angle of arrival $\theta(t)$ is determined according to the following equation:

$$\theta(t) = \cos^{-1}\left(\frac{-\dot{d}}{v}\right),$$

where v represents the satellite velocity, d represents the path length (i.e., the distance from the satellite to the terminal), and $\dot{d}$ represents the first derivative of the path length.

Alternatively, the angle of arrival $\theta(t)$ can be determined according to the following equation:

$$\theta(t) = \sin^{-1}\left(\frac{\sqrt{d\ddot{d}}}{v}\right),$$

where v represents the satellite velocity, d represents the path length, and $\ddot{d}$ represents the second derivative of the path length.

In this embodiment, the remaining ambiguity concerning on which of two points that the surface of the earth intersects with the base of the cone the transceiver is located can be resolved by determining from which satellite beam on the satellite received the response from the transceiver. Alternatively, this ambiguity can be resolved by comparing earlier positions of the transceiver.

A transmitter for use in a geopositioning system, includes a synchronization spreading code generator, a data spreading code generator, a forward error corrector, a first modulator, a first chip filter, a second chip filter, a delay element coupled to the first chip filter, a second modulator being coupled to the delay element, a third modulator, and a summer. The synchronization spreading code generator generates a synchronization code spreading signal. The data spreading code generator generates a data code spreading signal. The forward error corrector encodes user data for later error correction at a receive end. The first modulator is coupled to the data code generator and the forward error corrector and modulates the encoded data on the data code spreading signal to form a data signal. The first chip filter is coupled to first modulator and filters the data signal. The second chip filter is coupled to the synchronization code generator and filters the synchronization code spreading signal. The delay element is coupled to the first chip filter. The second modulator is coupled to the delay element. The third modulator is coupled to the second chip filter and is 90° out of phase relative to the second modulator. The summer is coupled to the second modulator and the third modulator and outputs a combined synchronization and data signal.

BRIEF DESCRIPTION OF THE DRAWINGS

FIG. 12 depicts yet a third embodiment of the synchronization technique of the present invention.

DETAILED DESCRIPTION

Figure 1:
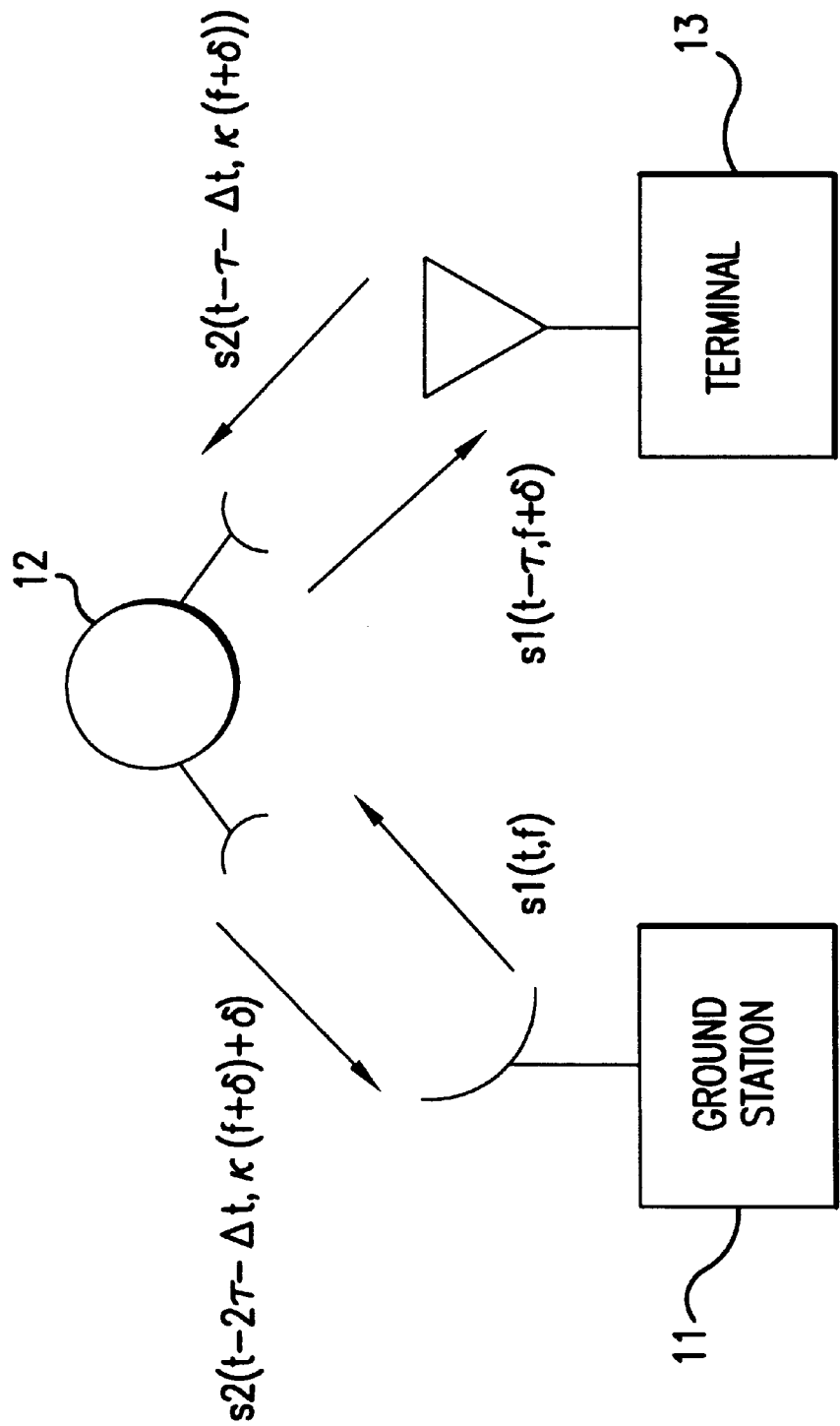
FIG. 1 depicts a block diagram of the geopositioning system 10 of the present invention.

The present invention uses a Low Earth Orbiting (LEO) satellite system to provide location and data communications services to mobile users equipped with a receiver/transmitter. In some applications, however, the user may not be the "customer" of the location data, such as when the mobile user is a parolee, in which case the "customer" of the location data is the parole officer, or when the mobile "user" is a package, in which case the customer of the location data is the sender, delivery service or recipient of the package. The receiver/transmitter acts as a transponder that responds to a query transmitted over the satellite network as shown in FIG. 1. The response is sent after a precisely controlled time interval after the transponder receives the query so that the ground station can estimate the length of the propagation path from the satellite to the transponder.

Referring to FIG. 1, the ground station 11 transmits a signal $s_1(t,f)$ at a time t and at a frequency $f$ to a satellite 12, which broadcasts the signal back to the earth. The signal $s_1(t,f)$ is received by the user terminal 13 as $s_1(t-\tau, f+\delta)$, i.e., at a time t–τ and at a frequency $f+\delta$, in which τ is due to the path delay and δ is due to the Doppler shift. The user terminal 13 transmits a signal $s_2(t-\tau-\Delta t, k(f+\delta))$ at a time t–τ–Δt, and at a frequency proportional to the incoming frequency $k(f+\delta)$. This signal is received at the ground station 11 with additional path delay and Doppler shift, i.e., $s_2(t-2\tau-\Delta t, k(f+\delta)+\delta)$. The user receiver/transmitter 13 acts as a transponder so that the length of the propagation path, the derivative of the length, and the second derivative of the path length can be estimated by the ground station 11 according to the present invention. The satellite may translate the uplink and downlink frequencies, but the frequency shift is known in advance and is compensated for in the ground station's calculations. In this embodiment of the present invention, the model is simplified by assuming that no such translation takes place, however, the fundamental application of the present invention remains unaffected by this assumption.

The transponder transmits the response at a frequency that is proportional to the frequency of the received query so that the ground station 11 can estimate the first and second derivatives of the length of the propagation path according to the measured Doppler shift. The reason for the proportional response is to eliminate the absolute frequency of the local oscillator in the transponder as a source of bias in the transmitted frequency. In addition to simplifying the analysis and improving the accuracy of the position estimate, the proportional response eliminates the need for an expensive reference oscillator, which reduces the cost of the mobile unit, thereby making the geopositioning system practical for a wide variety of uses that were heretofore impractical from a cost standpoint.

Figure 2:
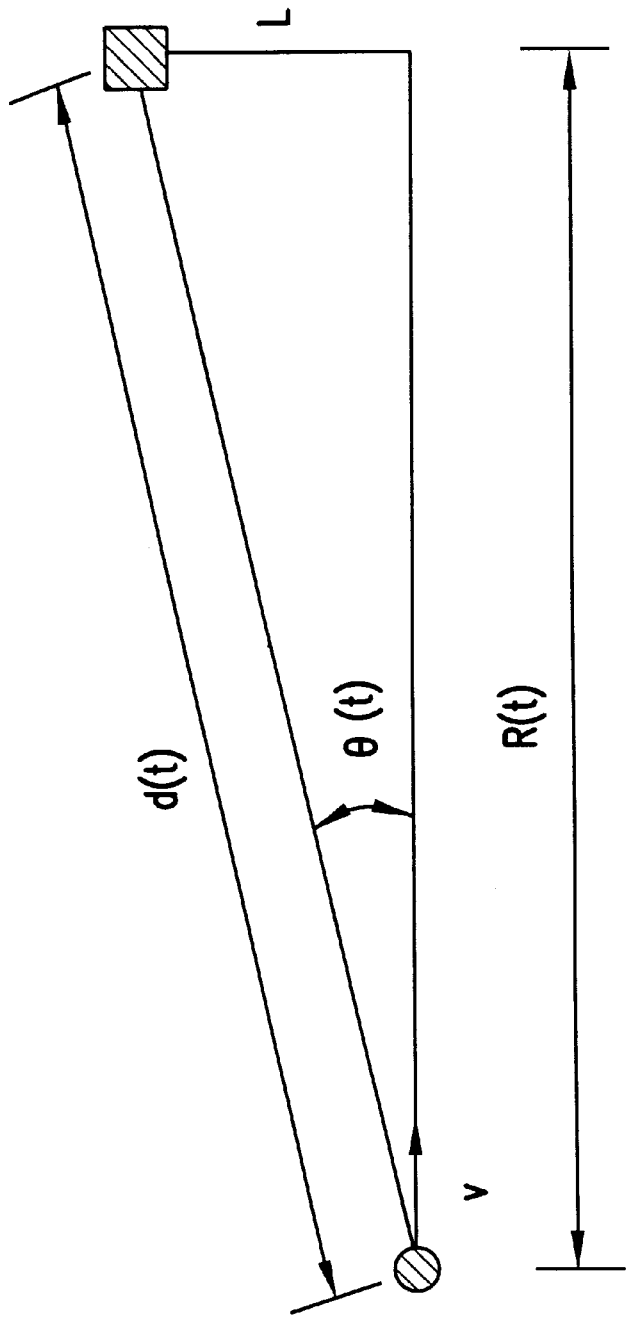
FIG. 2 depicts the relationship between position of the user terminal relative to the satellite position and the measurements of the path length and its first and second derivatives according to the present invention.

The ground station 11 also estimates the satellite positioning using telemetry from the satellite 12 obtained from an on-board GPS receiver (not shown). The position of the user terminal 13 relative to the satellite position is then determined from the path length measurements as shown in FIG. 2. Given the satellite position p and satellite velocity v at a particular instant in time, the measured path length d(t) from the satellite to the transponder, and its first ($\dot{d}$) and second derivatives ($\ddot{d}$) are used to determine the angle θ(t) (at time t) between the direction of satellite R(t) motion and the line of bearing d(t) to the user terminal 13. This angle θ(t) defines a cone with the satellite 12 at the origin. The user terminal position is somewhere on the circle defined by the cone and the estimated path length d. The intersection of this circle with the surface of the Earth yields two possible user positions. The ambiguity can be resolved using knowledge of the satellite beam employed to query the user terminal or by comparing the two possible positions with earlier position fixes.

Generally, there are three ways to resolve the ambiguity. The first method determines which one of the two possible positions lies within in the antenna beam used by the transponder. If only one position satisfies this condition, then this position is the correct position. If both possible positions lie in the beam, then other methods must be used.

The second method compares the pair of possible positions with another pair determined previously. The "correct" points will be close together, whereas the "incorrect" points will be ftirther apart due to the different satellite positions at the times when the pairs were collected.

The third method uses nearby satellites to receive the transponder signal. These satellites can also be used to locate the transponder; the "correct" locations from all satellites should align closely, whereas "incorrect" position fixes should be scattered. It may not be necessary to locate the transponder from these satellites; once again, the beam which the signal is received in is associated with a known "footprint" on the surface of the Earth, and a point can be ruled out as a potential location if it could not have been received on any of the satellite beams where the signal was detected.

FIG. 2 depicts the relationship between the position of the user terminal relative to the satellite position and the measurements of the path length and its first and second derivatives according to the present invention. The satellite 12, which is at a distance d(t) that is a function of time, moves at velocity v at an angle θ(t) (also a function of time) relative to the user terminal 13. L represents the perpendicular distance from the vector v to the user terminal 13. R(t) represents the distance from the satellite to the point at which the vector v intersects the line L, i.e., where θ(t) becomes 90°.

Using the Doppler method, the angle θ(t) can be calculated from the following equation:

$$\theta(t) = \cos^{-1}\left(\frac{-\dot{d}}{v}\right),$$

where v represents the satellite velocity, d represents the path length, and $\dot{d}$ represents the first derivative of the path length.

Using the Doppler slope method, the angle θ(t) can be calculated from the following equation:

$$\theta(t) = \sin^{-1}\left(\frac{\sqrt{d\ddot{d}}}{v}\right),$$

where v represents the satellite velocity, d represents the path length, and $\ddot{d}$ represents the second derivative of the path length.

Figure 3:
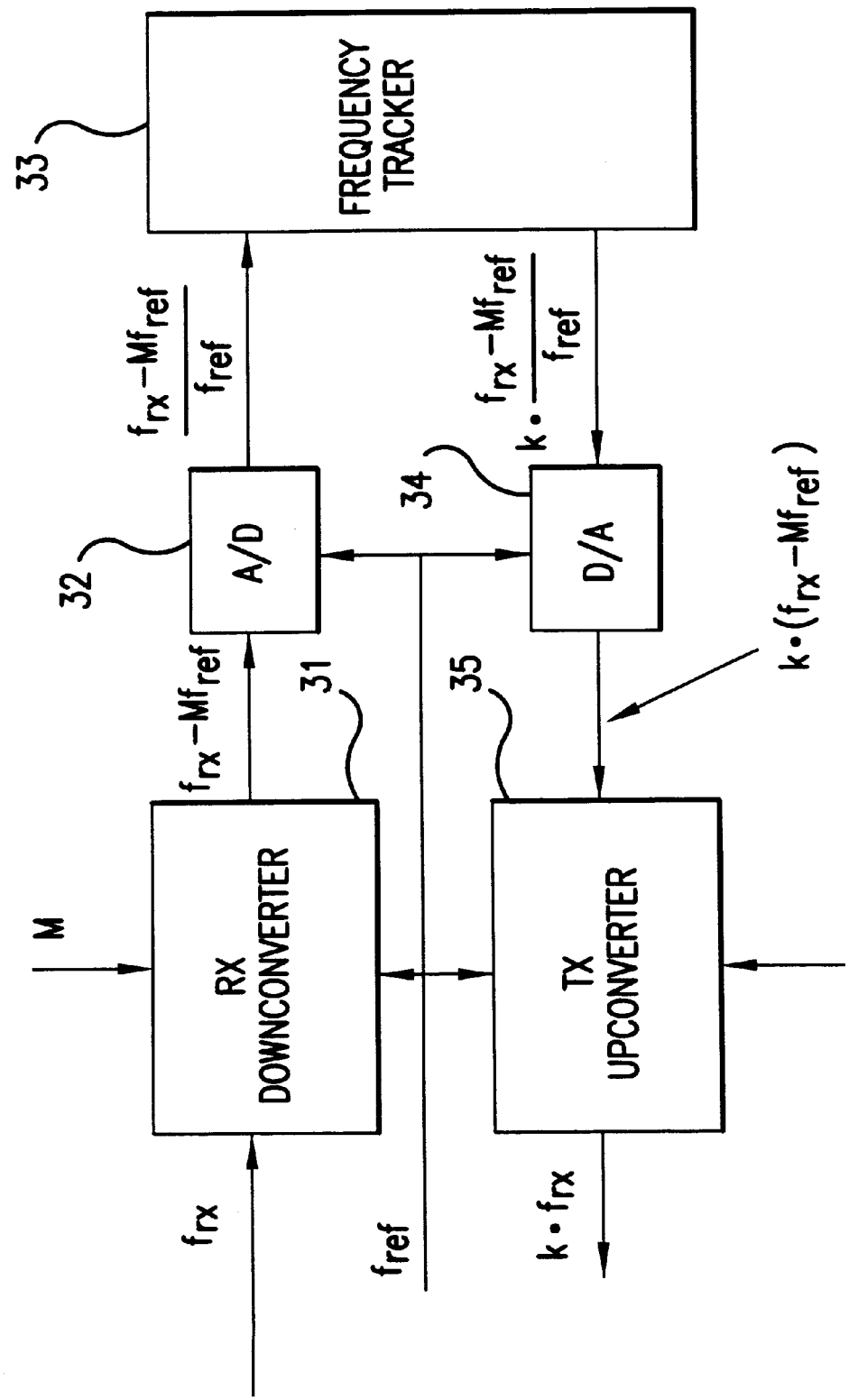
FIG. 3 depicts a block diagram of the timing in the user terminal according to the present invention.

Turning to FIG. 3, the user terminal 13 uses a single frequency reference to provide timing for the receive and transmit frequency synthesizers and for the analog-to digital (A/D) and digital-to-analog (D/A) converters. The frequency tracking algorithm shifts the baseband frequency of the response by a factor k so that the output frequency is related to the frequency of the received signal by the same factor k. This eliminates the absolute frequency of the reference as a source of error and allows the use of less expensive oscillators in the user terminal 13.

As depicted in FIG. 3, the incoming frequency $f_{rx}$ is downconverted by the downconverter 31 to a new frequency $f_{rx}-Mf_{ref}$. The downconverted frequency is then input to an analog-to-digital (AID) converter 32, which also uses $f_{ref}$ as a frequency source. The output frequency is then $$\frac{f_{rx}-Mf_{ref}}{f_{ref}},$$

which is then input to the frequency tracker 33. The output frequency from the frequency tracker 33 is proportional to the frequency input to the frequency tracker 33, i.e., $$k \cdot \frac{f_{rx}-Mf_{ref}}{f_{ref}}.$$

This frequency is then input to digital-to-analog (D/A) converter 34, which uses the same frequency reference as the A/D converter, $\theta_{ref}$. The output from the D/A converter 34 is $k \cdot (f_{rx}-Mf_{ref})$, which is input to the transmitter upconverter 35, which upconverts the frequency to a frequency that is proportional to the incoming frequency only, i.e., it removes the $-k \cdot Mf_{ref}$ term, thus transmitting at a frequency of $k \cdot f_{rx}$. Consequently, the transmission frequency is directly proportional to the incoming frequency, thus eliminating any source of error in the frequency measurement due to inaccuracy in the reference oscillator in the user terminal 13, and enabling the use of a less expensive frequency reference.

Waveform Specification

Figure 4:
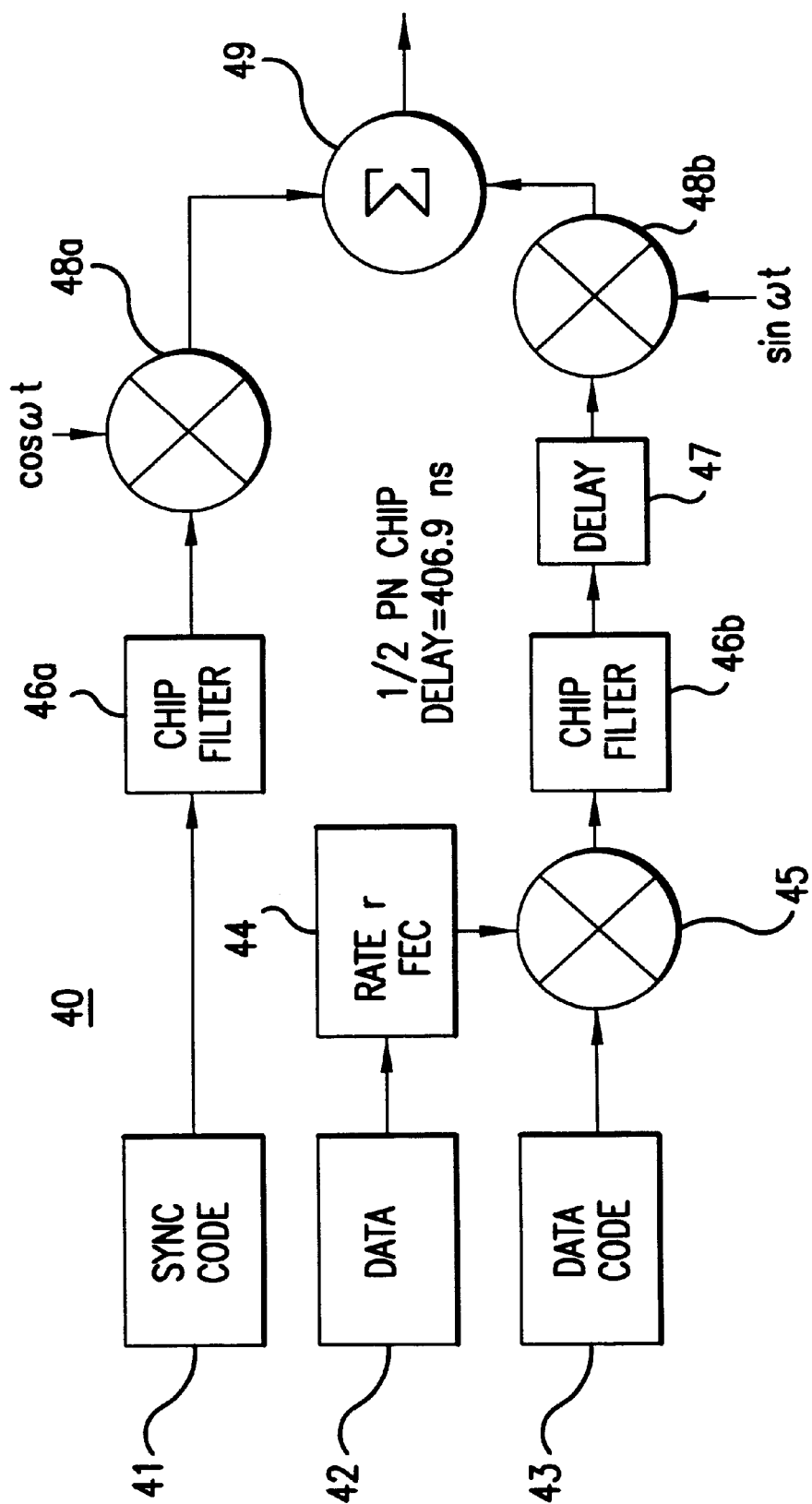
FIG. 4 depicts a block diagram of the channel structure of the transmitter according to the present invention.
Figure 5:
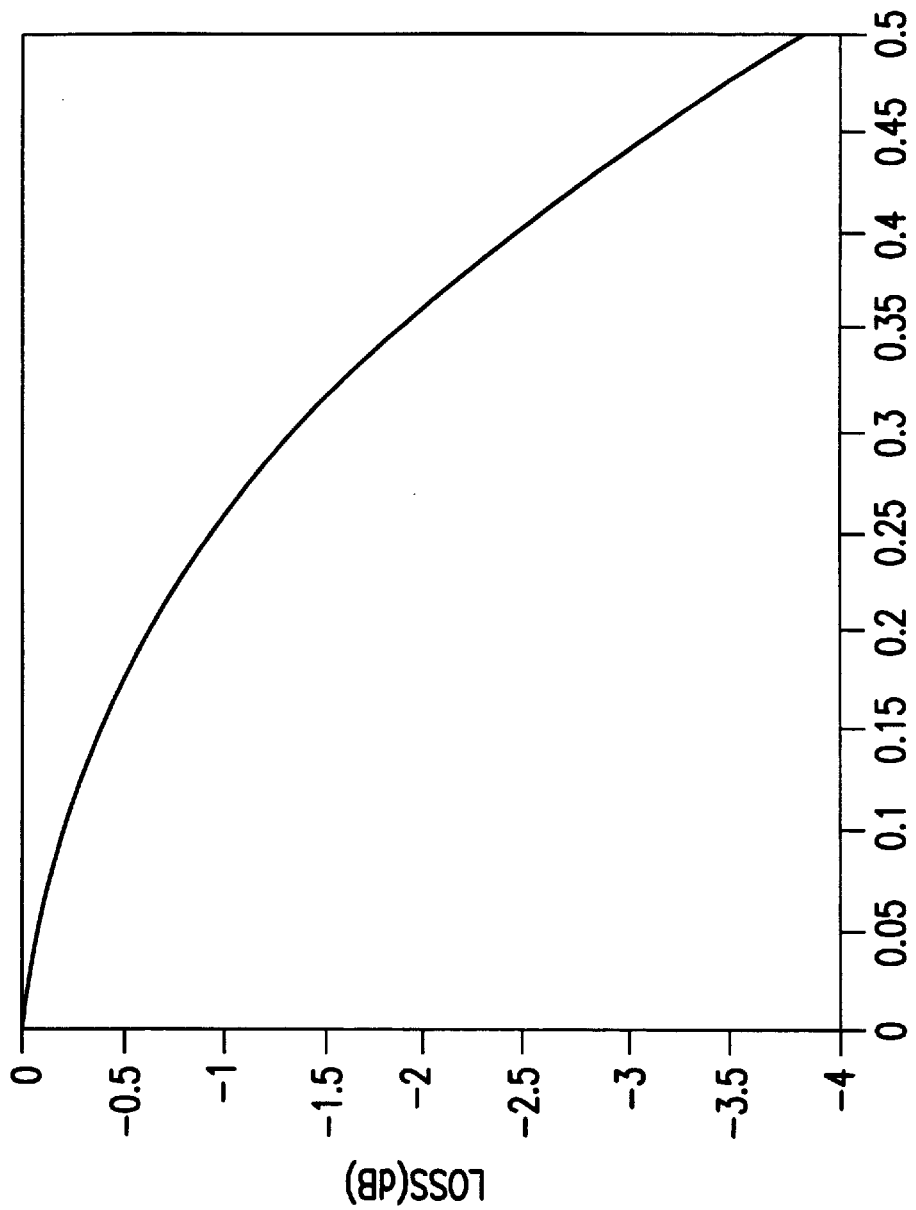
FIG. 5 depicts the integration loss as a function of uncompensated Doppler.

On possible embodiment of the channel structure 40 is illustrated in FIG. 4. Two baseband spread-spectrum signals 41, 43 modulate a carrier 48a, 48b, a synchronization signal and a data signal 42. The synchronization signal modulates the in-phase (I) component of the carrier, and the data signal 42 modulates the quadrature-phase (Q) component of the carrier. The data signal 42 is delayed one-half chip by ½PN chip delay 47 with respect to the synchronization signal. The synchronization 41 and data spreading code generators 43 produce repeated pairs of 64 chip sequences at a chip rate of 1.2288 Megahertz (MHZ). The data spreading sequence is modulated by a supercode at the data spreading sequence repetition rate of 19200 Hz. This supercode is derived from the operation of the rate r=1/384 Forward Error Correction (FEC) coder 44 on a 50 bits per second data sequence. The modulated data and synchronization sequences are filtered prior to carrier modulation by chip filters 46a, 46b. The outputs of the modulators are summed at summer 49.

Synchronization Spreading Sequence

The synchronization spreading sequence is a 64-chip augmented maximal length Pseudo random (PN) code. A 63 chip sequence is augmented by adding a 0 to the sequence of five consecutive 0's.

Data Spreading Sequence

The data spreading sequence is a 64-chip augmented maximal length PN code. A 63 chip sequence is augmented by adding a 0 to the sequence of five consecutive 0's.

Forward Error Correction

The Forward Error Correction (FEC) coder 44 produces the supercode sequence at a rate of 19200 code bits per second from a data stream of 50 bits per second. The FEC coder 44 is made up of two cascaded coders, a rate ⅓ convolutional coder and a 16-ary orthogonal block coder. The output of the FEC coder 44 is fed to the modulator 45 and mixed with the output from the data code generator 43.

Convolutional Coder

The rate ⅓ convolutional coder accepts input data at a 50 Hz rate and produces code bits at a 150 Hz rate. The generator functions for this code shall be denoted as $g_0$, $g_1$, and $g_2$. The code output order is $\{C_0, C_1, C_2\}$ where generator output $c_1$ is associated with generator function $g_1$. The state of the convolutional encoder, upon initialization, shall be the all-zero state. The first code symbol output after initialization shall be the code symbol encoded with generator function $g_0$.

Orthogonal Block Coder

The supercode is produced by 16-ary orthogonal modulation of the convolutional coder output. One of 16 possible modulation symbols is transmitted for each group of four code symbols. The modulation symbol shall be one of 16 mutually orthogonal sequences of 512 supercode chips. Each supercode ship corresponds in length to a single repetition of the data spreading sequence.

Chip Filters

The chip filters 46a, 46b each accept digital data at a 1.2288 MHZ rate and produce interpolated and filtered baseband data at 4.9152 MHZ, a rate four times higher.

Data Modulation

The structure of the data packets is different for the forward and reverse links. On the forward link, transmission is continuous and packets follow each other without interruption. On the reverse link, individual units respond in a polled TDMA fashion.

Rapid Acquisition

Rapid acquisition of the spread-spectrum signal is important for two reasons. In the user terminal, minimizing acquisition time extends the life of the battery. In the ground station, minimizing acquisition time expands the capacity of the channel, allowing a greater number of users or more data. The synchronization signal that is transmitted in quadrature with the data signal enables rapid acquisition.

Figure 10:
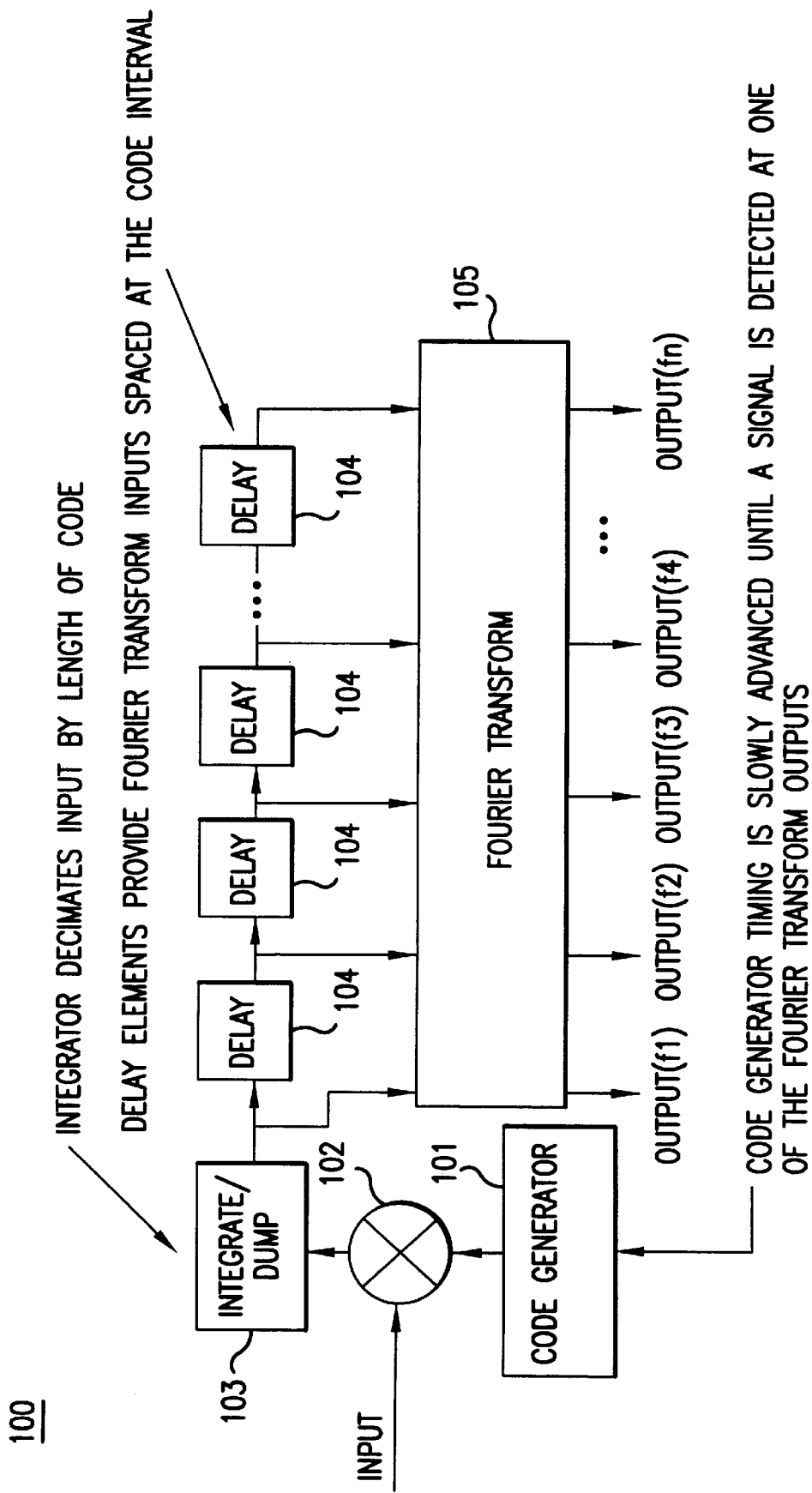
FIG. 10 depicts one embodiment of the synchronization technique of the present invention.

FIG. 10 depicts one possible embodiment 100 for performing synchronization according to the present invention. The input signal is mixed with the codeword sequence output by the code generator 101. The resulting output from the mixer 102 is coupled to an integrator 103, which decimates the input by the length of the code sequence. The integrator contents is then dumped to a series of delay elements 104, the outputs of which are input to a Fast Fourier Transform 105, which provides multiple outputs. The delay elements 104 provide Fourier Transform inputs spaced at the code interval. The code generator timing is slowly advanced until a signal is detected at one of the Fourier Transform outputs.

Figure 11:
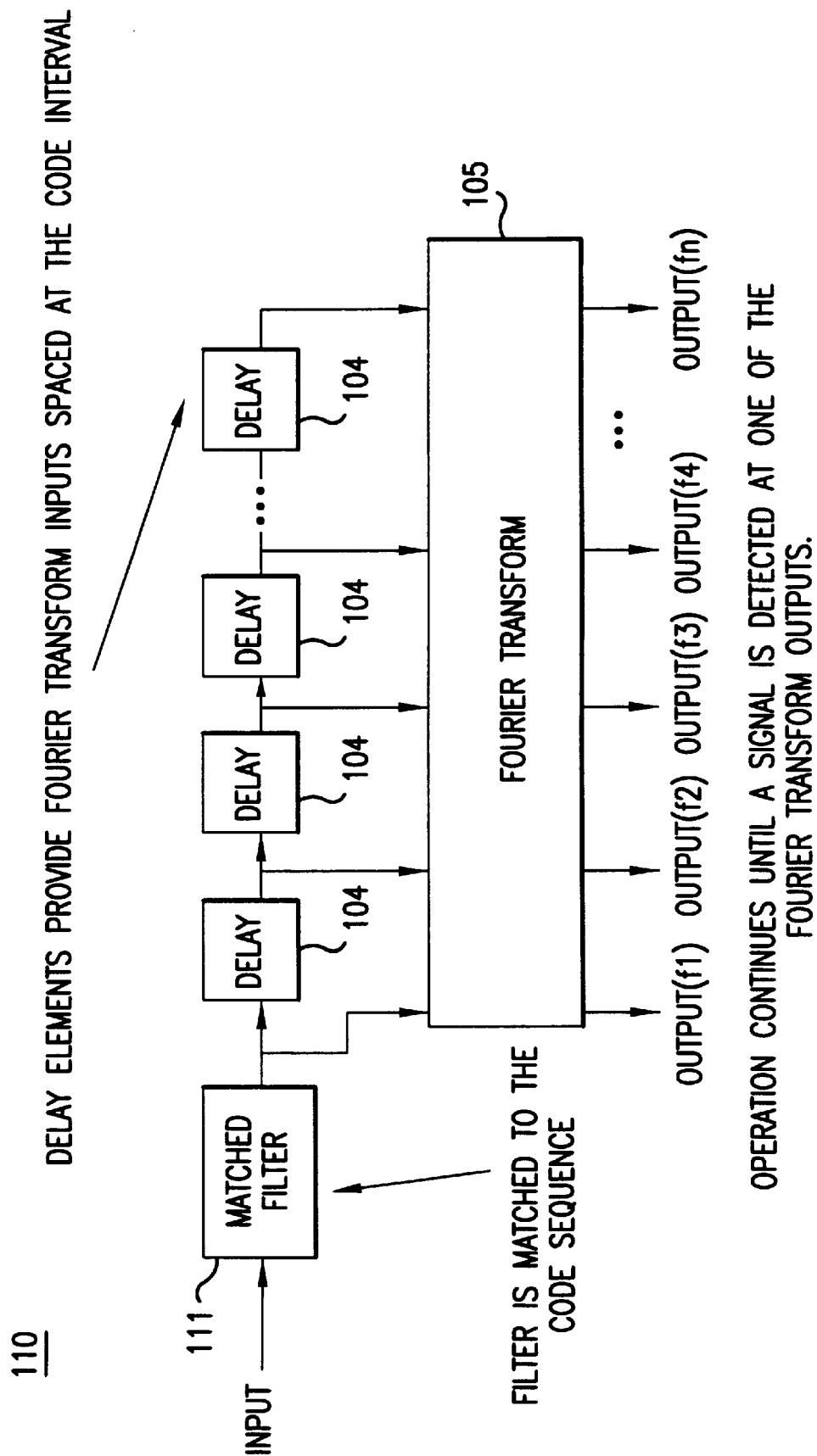
FIG. 11 depicts another embodiment of the synchronization technique of the present invention.

To overcome the two problems of acquisition of timing and Doppler, parallel search techniques can be used to overcome the limitations of serial acquisition. By replacing the correlation receiver (i.e., the code generator 101, the mixer 102, and the integrator 103, with a matched filter 111, the designer can eliminate the timing acquisition entirely. In this case, the matched filter 111 is matched to the code sequence. As before, operation continues until a signal is detected at one of the Fourier Transform outputs. This embodiment 110 is depicted in FIG. 11. The drawback is the computation rate $Tf_c^2$ might require expensive hardware to operate. With $T=\frac{1}{50}$ seconds, and $f_c=1$ MHZ, the required rate is 20 billion operations per second.

Doppler acquisition can be expedited by operating a bank of correlators in parallel. A bank of N such correlators reduces the maximum search time by a factor of N. This embodiment is depicted in FIG. 12. Each correlator is as shown in FIG. 10, but the code generator 101 in each has a different time offset than the others. In this embodiment, operation continues until a signal is detected at one of the Fourier Transform outputs of any correlator channel.

Figure 6:
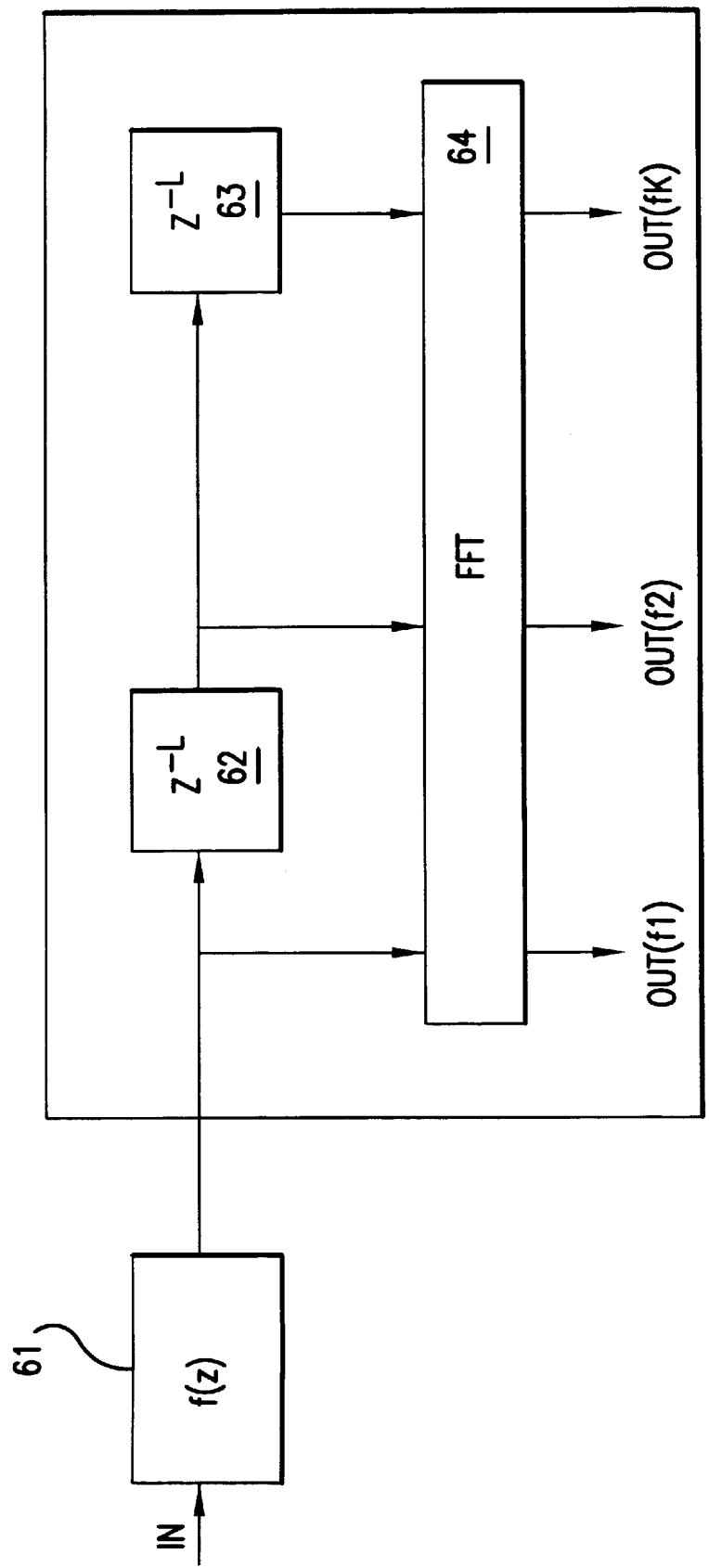
FIG. 6 depicts a block diagram of the use of the synchronization signal to rapidly acquire Doppler according to the present invention.

The present invention uses the synchronization signal to resolve Doppler ambiguity as shown in FIG. 6. The bank of correlators 61 $f(z)$ operate with the L=64 chip synchronization code sequence. The correlator outputs are decimated to 19.2 kHz and then processed by a Fast Fourier Transform (FFT) 64. A total of 512 parallel correlator outputs provides a total processing gain of 64*512=32768. The FFT output is searched for the maximum amplitude. If this amplitude exceeds a threshold, then the signal is assumed to have been detected at the current correlator code offset with a Doppler frequency given by the frequency of the maximum FFT output. If no signal has been detected, then the correlator code offset is incremented and the entire procedure is repeated until all possible 64 code offsets have been tested. Multiple correlators can be used to speed this procedure.

After the synchronization and data code correlators are properly synchronized to the signal, symbol synchronization is performed. The data correlator outputs are further processed by a 512-tap matched filter to search for a frame synchronization symbol that begins each transmission. When such a symbol is detected, subsequent symbols are processed by a Forward Error Correction (FEC) algorithm to recover the data.

Tracking

Figure 7:
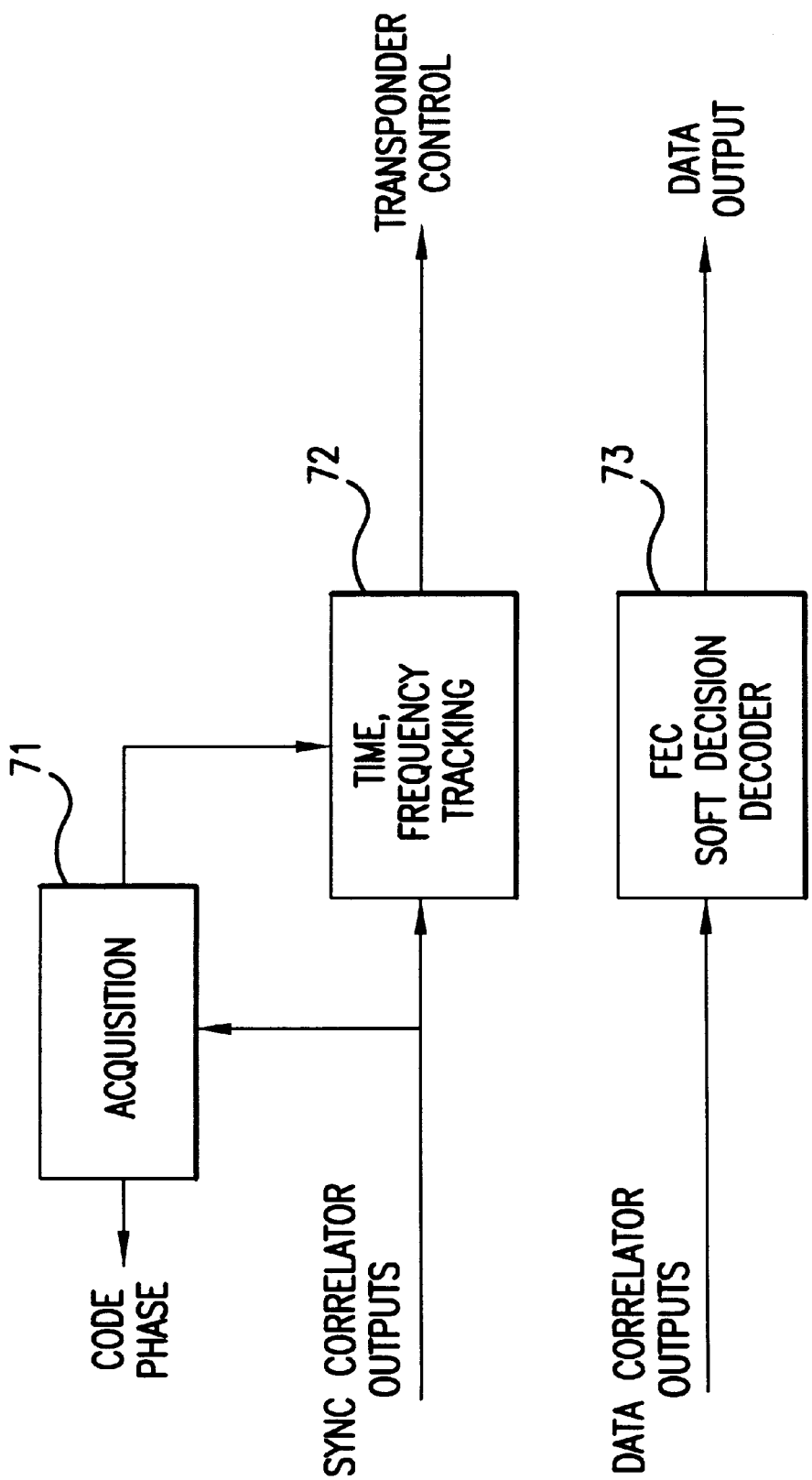
FIG. 7 depicts a block diagram of the acquisition process, which initializes the frequency and the time tracking according to the present invention.

Once the initial Doppler offset and code offset have been determined, time and frequency tracking loops refine the estimates and adapt to changing Doppler induced by satellite motion as shown in FIG. 7.

Figure 8:
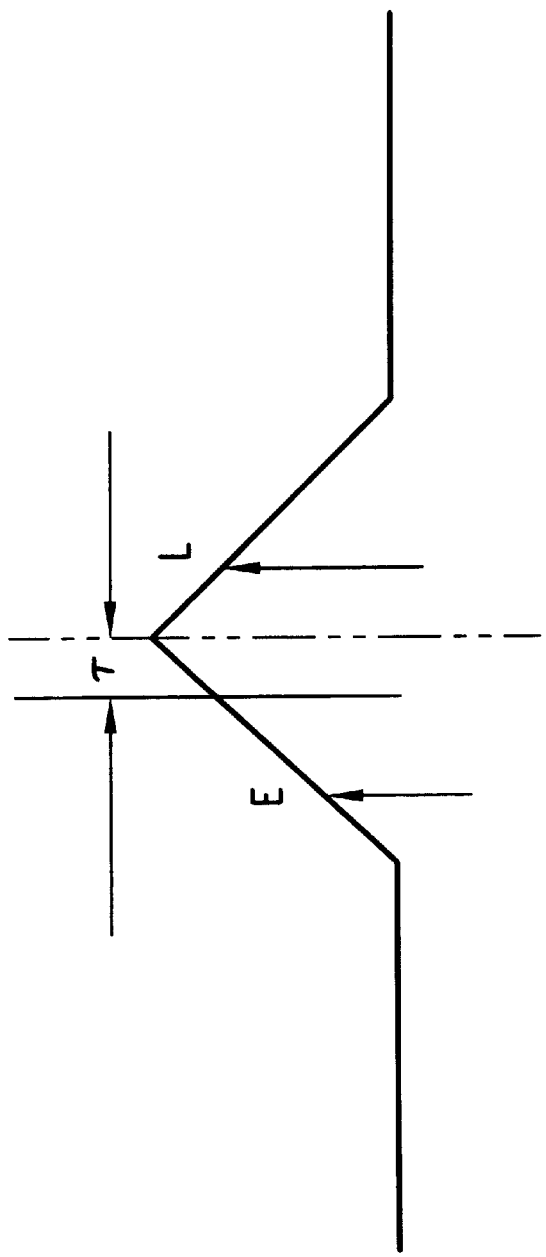
FIG. 8 depicts the Early-Late correlators used in the present invention, which provide a method for estimating timing error.
Figure 9:
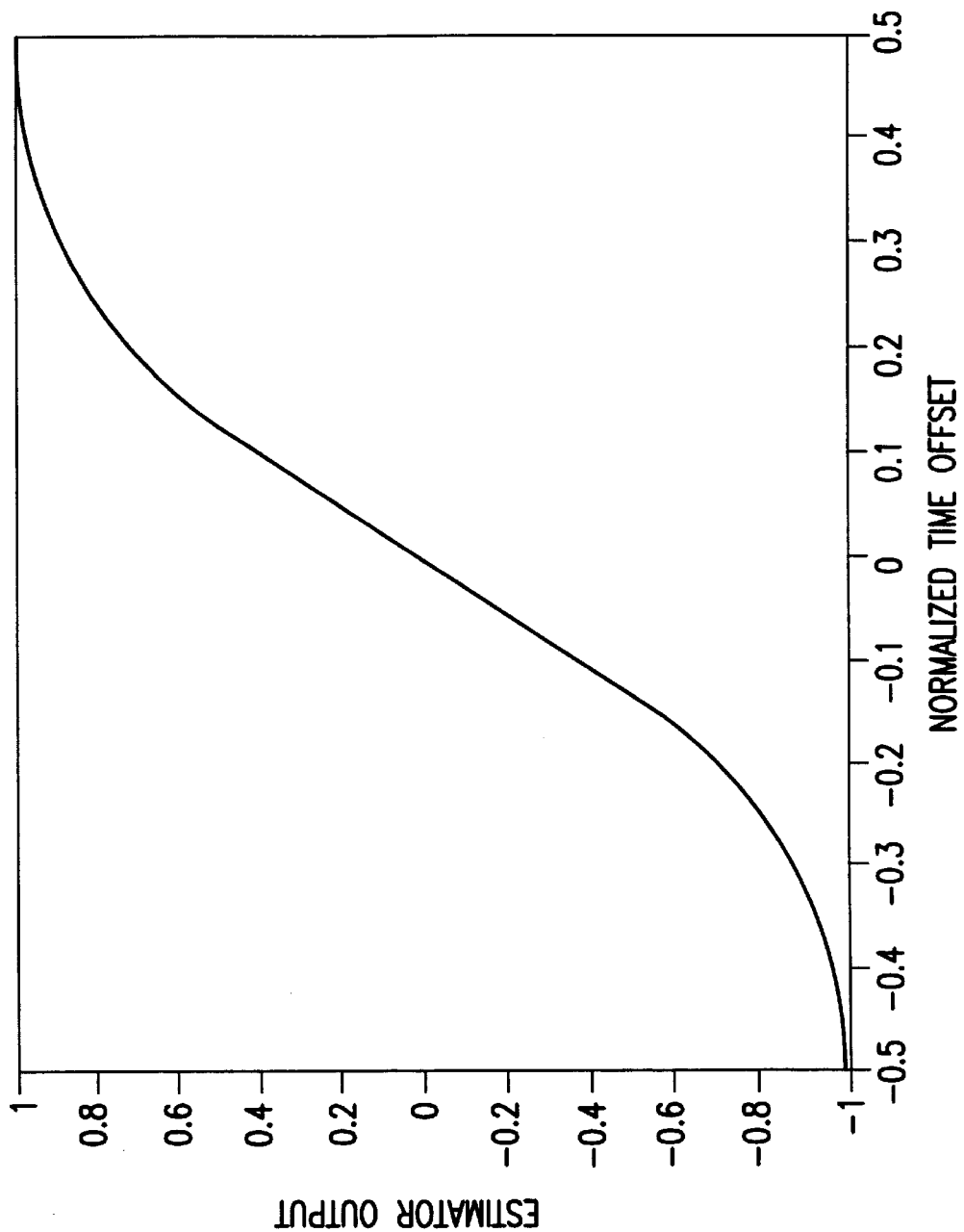
FIG. 9 depicts an example of a function θ(t) that is used to correct for chip waveforms that produce more rounded outputs than those depicted in FIG. 8.

The time tracking loop uses a pair of correlators operating at slightly different delays to measure the timing error as shown in FIG. 8. The idealized triangular correlator output is shown for the case of rectangular chips. Other chip waveforms will produce more rounded outputs. An example of the function $f(t)$ that is used to correct for this rounding is shown in FIG. 9.

This section describes how the user terminal operates. The ground station is free to use other non-real-time techniques for extracting timing.

Additional Positional Accuracy Technique

The positional accuracy of the system depends upon the relative positions of the satellite and the transponder. There are some geometries where the positioning accuracy is degraded. One way to improve the positioning accuracy under these circumstances is to use the signals received from other satellites. For example, if the signal is transmitted over the primary satellite at time $t_1$ and is received at time $t_2$, then the propagation time from the ground station to the transponder through the primary satellite is $t_p=(t_2-t_1)/2-t_0$, where $t_0$ is the transponder time delay. If the transponder time response is also received over a secondary satellite at time $t_3$, then the propagation time from the ground station to the transponder through the secondary satellite is $t_s=t_3-t_1-t_p-t_0$. This propagation time taken together with knowledge of the position of the secondary satellite, defines a sphere around the secondary satellite that intersects the Earth along a curve containing the transponder location. This curve can be combined with the information derived from the primary satellite to provide a more accurate estimate of the transponder location. This approach can be extended to the case of multiple satellites and to also exploit the Doppler and Doppler derivative information derived from multiple satellites.

What is claimed is:

1. A transmitter for use in a geopositioning system, comprising:

a) a synchronization spreading code generator generating a synchronization code spreading signal;

b) a data spreading code generator generating a data code spreading signal;

c) a forward error corrector encoding user data for later error correction at a receive end;

d) a first modulator being coupled to the data code generator and the forward error corrector and modulating the encoded data on the data code spreading signal to form a data signal;

e) a first chip filter being coupled to first modulator and filtering the data signal, f) a second chip filter being coupled to the synchronization code generator and filtering the synchronization code spreading signal;

g) a second modulator being coupled to the delay element;

h) a third modulator being coupled to the second chip filter, i) a summer coupled to the second modulator and the third modulator and outputting a combined synchronization and data signal.

2. The transmitter according to claim 1, further comprising a delay element being coupled to the first chip filter and delaying one of the data or synchronization signals with respect to the other by one half chip.

3. The transmitter according to claim 1, wherein the synchronization and data spreading code generators produce repeated pairs of multilength chip sequences at a predetermined chip rate, and the data spreading sequence is modulated by a supercode at a predetermined data spreading sequence repetition rate.

4. The transmitter according to claim 3, wherein the synchronization spreading code generator produces a synchronization spreading sequence that is a multi-chip augmented maximal length pseudo random code, which is formed from a predetermined chip sequence that is augmented by adding a 0 to the predetermined sequence of consecutive 0's.

5. The transmitter according to claim 3, wherein the data spreading code generator produces a data spreading sequence that is a multi-chip augmented maximal length pseudo random code, which is formed from a predetermined chip sequence that is augmented by adding a 0 to the predetermined sequence of consecutive 0's.

6. The transmitter according to claim 3, wherein the forward error corrector produces a supercode sequence at a predetermined rate of code bits per second from a predetermined data stream, the forward error corrector includes two cascaded coders, a rate $1/3$ convolutional coder and a orthogonal block coder, and an output of the forward error corrector is coupled to the first modulator mixed with an output from the data spreading code generator.

7. The transmitter according to claim 3, wherein the chip filters each accept digital data at a first data rate and produce interpolated and filtered baseband data at a higher data rate.

8. The transmitter according to claim 3, wherein a structure of data packets is different for the forward and reverse links, on the forward link, transmission is continuous and packets follow each other without interruption, whereas on the reverse link, individual units respond in a polled TDMA fashion.

9. The transmitter according to claim 1, wherein the third modulator is ninety degrees out of phase relative to the first quadrature modulator.

* * * * *